3,415,141
DETENT MECHANISM
Warren J. Ungerman, Hatboro, Pa., assignor to Manufacturers Engineering and Equipment Corporation, a corporation of Pennsylvania
Filed Nov. 4, 1963, Ser. No. 320,984
4 Claims. (Cl. 74—527)

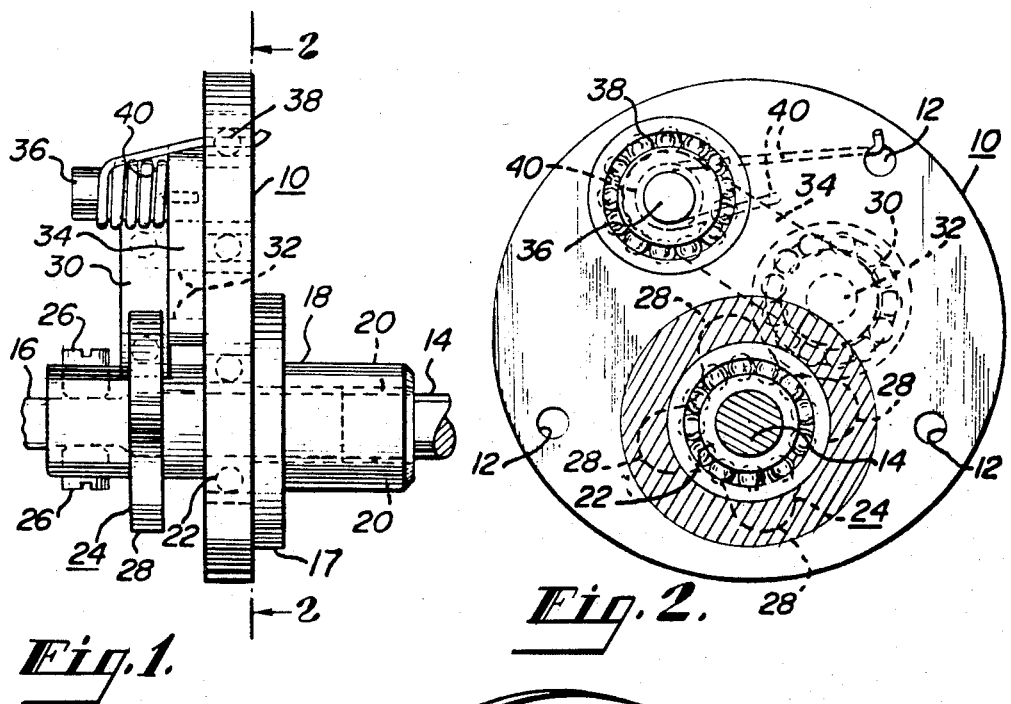
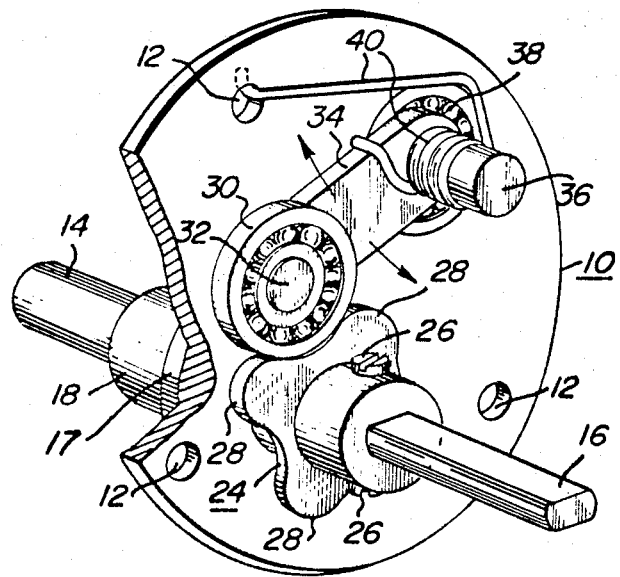
INVENTOR.
WARREN J. UNGERMAN

United States Patent Office 3,415,141
Patented Dec. 10, 1968

This invention relates to detent mechanisms for rotary switching systems, and more particularly to precision detent mechanisms which permits rotational movement of a control shaft in step-by-step increments.

It is desirable in many electrical and mechanical switching applications to provide a detent mechanism which provides highly accurate resettability even after long use. It is further desirable that the detent mechanism permit rotation of the control shaft with a relatively small torque, and yet provide positive detent action to firmly hold the control shaft at this detented position.

In known types of detent mechanisms, high spring pressure is applied between the stationary and rotatable detent elements in an effort to obtain accurate resettability. For example one type of detent mechanism comprises a captured ball bearing which may be moved relative to a detent plate having depressions in the path of the ball bearing and at the desired stop positions. High spring pressure is applied to force the ball bearing against the detent plate to provide a positive stop action. As a result of the high spring pressure, a relatively large torque is required to rotate the control shaft and in addition, the high pressure causes rapid wearing of the engaging parts so that any initial accuracy in resettability is quickly lost. Another known type of detent mechanism comprises a roller element which is spring biased against a scalloped detent plate. Again, the high spring pressure required for positive detent action causes rapid wear of the various parts, such as between one roller and the pin on which the roller is mounted. The dilemma here is that for accurate resettability the tolerance between the various moving parts must be very close. This means that a high torque is required to rotate the control shaft and that wear between the roller and its mounting pin is increased. In a relatively short time the high spring pressure causes wear between the moving parts, resulting in decreased accuracy of resettability.

It is an object of the present invention to provide an improved detent mechanism.

Another object of this invention is to provide an improved detent mechanism which provides highly accurate resettability for long periods of use.

A further object of this invention is to provide an improved detent mechanism for controlling the step-by-step rotation of a control shaft, wherein relatively low torque is required to rotate the control shaft and the resettability of the control shaft at any given position is highly accurate.

A detent mechanism in accordance with the invention comprises a shaped detent plate, and a roller element. The roller element and the detent plate are spring biased into engagement to provide a plurality of detent or stop positions. The roller element comprises a bearing race with ball or roller bearing between the race elements so that the forces created by the spring biasing are distributed to reduce wear. The use of a ball or roller bearing mount for the roller element reduces the backlash or play in the system thereby improving resettability. Furthermore the torque required to rotate the main control shaft is reduced.

The novel features which are considered to be characteristic of this invention will be set forth with particularity in the appended claims. The invention itself however, both as to its organization and method of operation, together with additional objects and advantages thereof will best be understood from the following specification when read in connection with the accompanying drawing, in which:

FIGURE 1 is a side view of a detent mechanism embodying the invention;

FIGURE 2 is a front view of the detent mechanism shown in FIGURE 1; and

FIGURE 3 is a perspective view of the detent mechanism shown in FIGURES 1 and 2.

Referring now to the drawings wherein like reference numerals will be used to indicate the same components, the detent mechanism includes a main base plate 10 having a plurality of apertures 12 for mounting the mechanism on a stationary chassis. A control shaft 14 which is rotatably mounted in the base plate, includes a flatted end 16 for connection to an electrical or mechanical device to be moved in step-by-step relation.

Included as an integral part of the base plate 10 is a boss 16 and a bearing portion 18. A bushing 20 is inserted in the bearing portion 18 to provide a bearing surface for the shaft 14. Mounted in the base plate 10 directly behind the boss 16 is a bearing race 22. As used herein, it will be understood that a bearing race comprises individual inner and outer race elements which provide therebetween a track or channel for a plurality of ball or roller bearings. The bearing race is prestressed to substantially eliminate play between the inner and outer race elements. The inner race element of the bearing race 22 is locked to the shaft 14, and the outer race element is securely affixed to the base plate 10. From the foregoing it will be seen that the bearing surfaces provided for the shaft 14 permits only rotational movement thereof, with substantially no sideways play in the shaft.

A detent plate 24 is mounted on the shaft 14 on the side of the base plate 10 opposite the boss 16. A pair of set screws 26 insure that the detent plate 24 rotates with the shaft 14. As shown in FIGURE 2, the detent plate includes four lobes 28, providing a scalloped edge over which a roller 30 is adapted to ride. The use of four lobes 28 provides four detent stop positions. It will be understood that any number of stop positions may be provided simply by redesigning the detent plate 24.

The roller 30 comprises a bearing race which may be of the same type described above. The inner race element of the roller 30 is fastened to a threaded screw fastener 32 which is screwed into one end of a lever 34. The outer race element or a tread portion secured thereto is adapted to ride over the scalloped edge portion of the detent plate 24 as the shaft 14 is rotated.

The opposite end of the lever 34 is fastened to a shaft 36 which in turn is fastened to the inner race element of a bearing race 38 mounted in the base plate 10. Thus the shaft 36, the inner race element of the bearing race 38, and the lever 34 all rotate together. The outer race of the bearing race 38 is affixed to the base plate 10.

A spring 40 which is wound around the shaft 36 has one end engaging the lever 34, and the other end extending through the mounting aperture 12. The spring tensioning is such as to urge the lever 34 about its pivot axis (shaft 36) in a direction causing the roller 30 to bear against the detent plate 24.

In operation, as the main shaft 14 is rotated, one of the lobes 28 forces the roller 30 and lever 34 in a counter clockwise direction. As the roller rides over the top of the lobe 28, the spring 40 urges the roller toward the nadir between the lobes to orient the shaft at a desired stop position. Since the bearing races provide substantially no play, extreme accuracy in resettability is achieved. Furthermore, since the stresses produced by the spring biasing means are distributed about the bearing race, continued use does not produce appreciable wear at the bearing surfaces, and accordingly the high accuracy of resettability is maintained even after long use.

Having described my invention, what is claimed is:

1. A detent mechanism comprising in combination a support member, a control shaft, means including a first bearing race with inner and outer relatively rotatable race portions for mounting said control shaft in said support member, the inner race portion of said first bearing race being fixed to said control shaft and the outer race portion of said first bearing race being fixed to said support member, a detent member having a scalloped configuration, means for mounting said detent plate on said control shaft, a roller member having a second bearing race with inner and outer relatively rotatable race portions, means supporting said inner race portion of said second bearing race so that the periphery of said roller member engages said detent member, and means for urging said roller member against said detent plate.

2. A detent mechanism comprising in combination, a support member, a control shaft, means including a first bearing race with inner and outer relatively rotatable race portions for mounting said control shaft in said support member, the inner race portion of said first bearing race being fixed to said control shaft and the outer race portion of said first bearing race being fixed to said support member, a detent member having a scalloped shaped detent surface mounted on said control shaft, a roller member comprising a second bearing race having inner and outer bearing race portions, a lever affixed at one end to the inner race portion of said second bearing race, a third bearing race having an outer race portion affixed to said support member and an inner race portion affixed to the other end of said lever, the relative positioning of said detent member and said third bearing race being such as to permit said roller member to engage said scalloped shaped detent surface, and resilient means coupled between said support member and said lever to urge said roller member against said detent surface.

3. A detent mechanism comprising in combination, a first support member, a detent plate control shaft, means for rotatably mounting said detent place control shaft on said first support member, a detent plate, a roller member for engaging said detent plate, means for mounting said roller member on a second support member, means for supporting said second support member in a spring-biased condition, said means including a second shaft and a means for mounting said second shaft on the aforementioned first support member, a means for mounting said detent plate on said detent plate control shaft.

4. A detent mechanism comprising, in combination, a first support member, a detent plate control shaft rotatably mounted in said first support member, a detent plate, a roller member for engaging said detent plate, said roller member including a bearing race having an inner race portion and an outer race portion, resilient biasing means for mounting said inner race portion on said first support member to spring-bias said roller member against said detent plate, including a second support member, means for supporting said second support member in a spring-biased condition, said means including a second shaft and a means for mounting said second shaft on the aforementioned first support member, a means for mounting said detent plate on said detent plate control shaft.

References Cited

UNITED STATES PATENTS

| 2,577,225 | 12/1951 | Barry. | |
|---|---|---|---|
| 2,502,925 | 4/1950 | Case | 308—189 |
| 3,059,498 | 10/1962 | Boyd | 74—527 |

FOREIGN PATENTS 601,036  12/1959  Italy.

FRED C. MATTERN, JR., *Primary Examiner.*

WESLEY S. RATLIFF, JR., *Assistant Examiner.*